(12) United States Patent
Zimpfer et al.

(10) Patent No.: US 7,017,610 B2
(45) Date of Patent: Mar. 28, 2006

(54) DAMPER FOR HYDRAULIC SYSTEMS

(75) Inventors: Michael Zimpfer, Ettlingen (DE);
Ralph Peter Merkel, Gaggenau (DE);
Andreas Richard Hilgert, Sinzheim (DE)

(73) Assignee: Eaton Fluid Power GmbH, Baden Baden (DE)

( * ) Notice: Subject to any disclaimer, the term of this patent is extended or adjusted under 35 U.S.C. 154(b) by 0 days.

(21) Appl. No.: 10/514,356

(22) PCT Filed: May 7, 2003

(86) PCT No.: PCT/DE03/01454

§ 371 (c)(1),
(2), (4) Date: Nov. 12, 2004

(87) PCT Pub. No.: WO03/095886

PCT Pub. Date: Nov. 20, 2003

(65) Prior Publication Data

US 2005/0173852 A1    Aug. 11, 2005

(30) Foreign Application Priority Data

May 14, 2002 (DE) ............................... 102 21 277

(51) Int. Cl.
*F16L 55/04* (2006.01)
(52) U.S. Cl. .............................. 138/30; 138/26; 138/44; 181/255; 181/249
(58) Field of Classification Search .................. 138/26, 138/30, 40, 44; 181/255, 249, 223, 227
See application file for complete search history.

(56) References Cited

U.S. PATENT DOCUMENTS

| | | | | | |
|---|---|---|---|---|---|
| 4,116,303 | A | * | 9/1978 | Trudell ........................ | 181/252 |
| 4,285,534 | A | * | 8/1981 | Katayama et al. .......... | 285/119 |
| 5,475,976 | A | * | 12/1995 | Phillips ........................ | 60/327 |
| 6,073,656 | A | * | 6/2000 | Chen et al. ................... | 138/26 |
| 6,158,472 | A | * | 12/2000 | Hilgert ........................ | 138/26 |
| 6,269,841 | B1 | * | 8/2001 | Chen et al. ................... | 138/30 |
| 6,279,613 | B1 | | 8/2001 | Chen et al. ................... | 138/30 |
| 6,360,777 | B1 | * | 3/2002 | Bae ............................. | 138/30 |
| 6,848,476 | B1 | * | 2/2005 | Davis .......................... | 138/26 |

FOREIGN PATENT DOCUMENTS

DE        35 10 267 A    10/1985

\* cited by examiner

*Primary Examiner*—Patrick Brinson
(74) *Attorney, Agent, or Firm*—Honigman Miller Schwartz and Cohn LLP

(57) ABSTRACT

Disclosed is a damping device to be incorporated into fluid systems, particularly hydraulic systems, said damping device comprising an expansion hose. An essentially rigid damper which is oriented counter to the direction of flow, is disposed inside the internal space of said expansion hose. The damper pipe is provided with a completely closed wall, resulting in a good damping effect. Preferably, the damper pipe is significantly less flexible in the radial direction than the outer expansion pipe, whereby the damping effect is substantially enhanced.

19 Claims, 2 Drawing Sheets

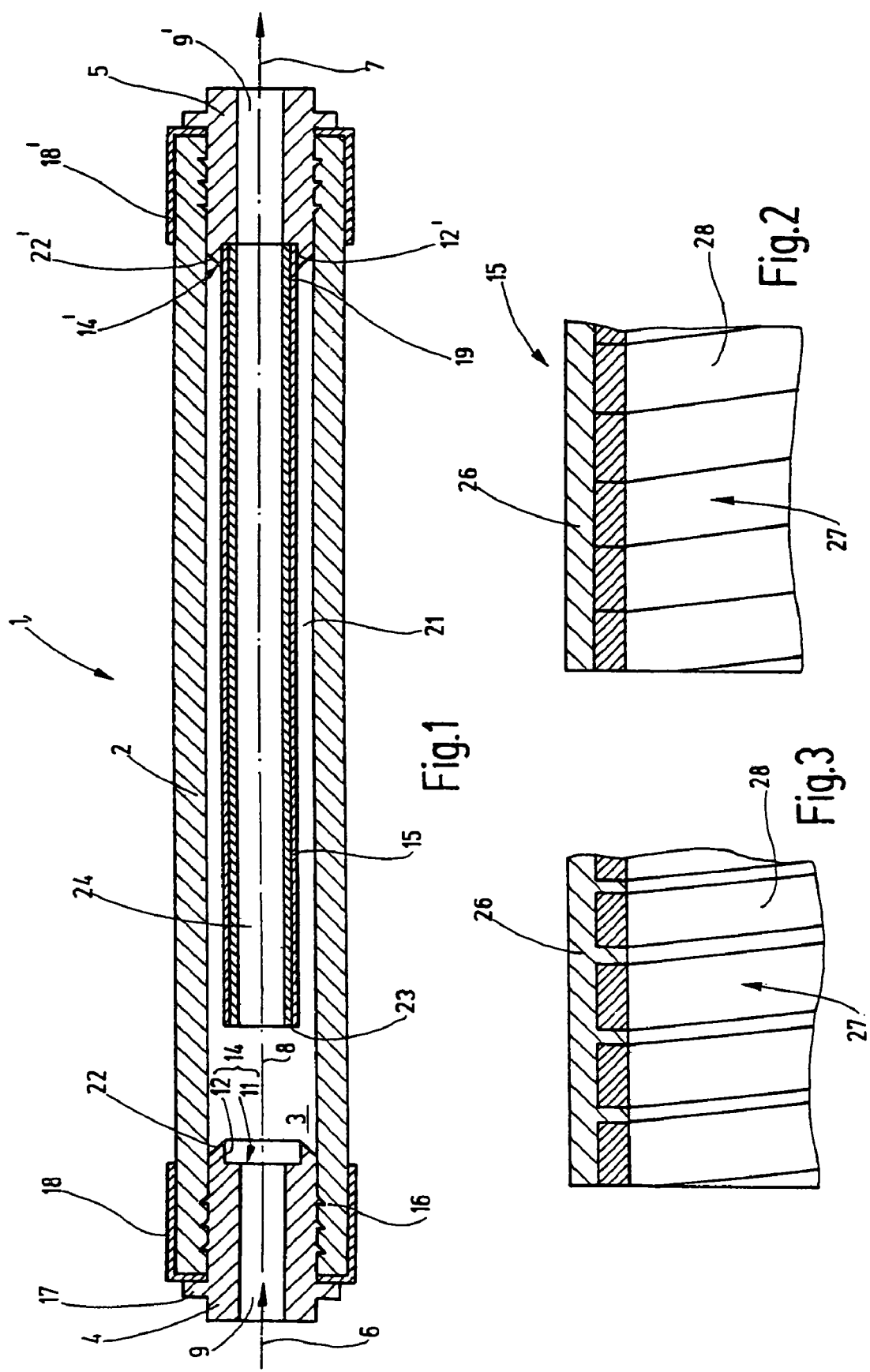

DAMPER FOR HYDRAULIC SYSTEMS

RELATED APPLICATIONS

This application claims priority to international patent application numbers PCT/DE03/01454, filed on May 7, 2003; and DE 102 21 277.5, filed on May 14, 2002, the disclosure of which is incorporated by reference herein in its entirety.

BACKGROUND OF THE INVENTION

1. Field of the Invention

The present invention relates to a damping device for damping vibrations and pulsations in fluid systems, specifically in hydraulic systems.

2. Description of the Related Art

Damping devices for hydraulic systems have been known, in which case, for example said devices are used for damping vibrations and pulsations caused by the drive source. Such devices are used for the reduction of sound, pulsations and pressure peaks. Such damping devices have an input and an output opening used for their insertion in a hydraulic system. The hydraulic fluid flows through said devices.

SUMMARY OF THE INVENTION

Pulsations, pressure peaks and similar pressure fluctuations occurring in hydraulic systems cover a spectrum which may also contain low-frequency components. The present invention is to solve the problem of providing a small, compact damping device which features good pulsation damping properties, in particular, also in the low-frequency range.

The inventive damping device comprises a damper housing, in which a damper pipe extending into the internal space is arranged counter to the direction of flow. This damper pipe has a closed wall, i.e., it does not have any bores or openings. As a result, a pressure-impervious resonator wall is created. Pressure shocks entering the internal space move as a pressure wave between the external wall of the damper housing and the damper pipe. These shocks are damped in this internal space. The shocks which reach the output connection have only a minimal effect. These shocks are reflected, as well as damped, in the annular space between the damper pipe and the wall of the damper housing.

The inventive damping device achieves a good damping effect, in particular, in the low-frequency range, as well as good hydraulic pulsation damping. Furthermore, the damping device is functionally safe and requires only a small space for installation.

The damper housing preferably is a tubular body which, in turn, preferably is configured as a cylindrical pipe. This cylindrical pipe encloses an internal space which does not have any built-in components, i.e., holders, flow elements or the like. Preferably, the damper pipe is configured as an expansion hose, i.e., the damper pipe preferably consists of an elastic or expandable material. A plastic material or an elastomer material may be used. Preferably, this material features internal damping capabilities so that incoming sound or pressure waves are at least partially damped due to dissipation.

The ends of the damper housing are preferably provided with connecting pieces which, for example, may be fastened to the internal wall of the expansion hose by means of annular ribs having a saw-tooth profile. Caps or sleeves, for example, pinch sleeves which extend over the damper housing, i.e., the expansion hose, secure the connecting piece so that even shock waves cannot drive this connecting piece out of the damper housing.

Considering a simplified design, the two connecting pieces are configured respectively in the same manner; however, they may comprise marks or other identifying symbols, or display differences, in order to be able to distinguish the input from the output of the damping device.

In a preferred form of embodiment at least the output-side connecting piece comprises a seat to which the damper pipe is mounted. The damper pipe extends in a self-supporting manner from this seat into the internal space of the damper housing, whereby the pipe is preferably fixed in a position concentric to the damper housing. As a result, an annular cul-de-sac is formed between the damper pipe and the damper housing, in which cul-de-sac the sound waves and the hydraulic pressure pulsations are reflected and damped.

The self-supporting arrangement of the damper pipe offers the advantage that reflections of the sound wave occur only at the end of said cul-de-sac. However, should this be desirable, additional elements may be located in this annular cul-de-sac in order to generate specifically targeted sound reflections.

The damper pipe has one open end for receiving the draining fluid which, preferably, is located opposite the input-side connecting piece, i.e., in coaxial alignment with the input-side connecting piece. This results in minimal flow resistance. A useful starting point for determining dimensions may be that the distance from the end of the damper pipe to the outlet of the input-side connecting piece into the internal space corresponds approximately to the diameter of the damper housing.

The damper pipe is preferably flexible, i.e., it is configured in such a manner that it can be bent slightly, whereby the pipe is as rigid as possible in radial direction. This pipe can be configured as a pipe of plastic material, preferably reinforced by a support structure. This structure may be embedded in the damper pipe. For example, the support structure may be a metal spiral, for example, a ribbon spiral coated with a plastic material, for example, PTFE. Furthermore, the plastic material may be applied by extrusion-coating or a shrink-on process. Other plastic materials which are stable with respect to the media used, and at existing temperatures, may also be provided. These plastic materials mainly serve to render the spiral-shaped ribbon structure impervious to media. Consequently, the medium can be transported only through the open end of the damper pipe which acts as a resonator.

BRIEF DESCRIPTION OF THE DRAWINGS

Additional details of advantageous forms of embodiments of the invention are provided by the drawings, the description or the subclaims. They show:

FIG. 1 is a simplified illustration of a sectional view, in longitudinal direction, of the inventive damping device;

FIG. 2 is a sectional view, in longitudinal direction, of part of the damping device of FIG. 1;

FIG. 3 is a sectional view, in longitudinal direction, of part of a modified form of embodiment of said damping device.

DETAILED DESCRIPTION OF THE INVENTION

Figure 4:
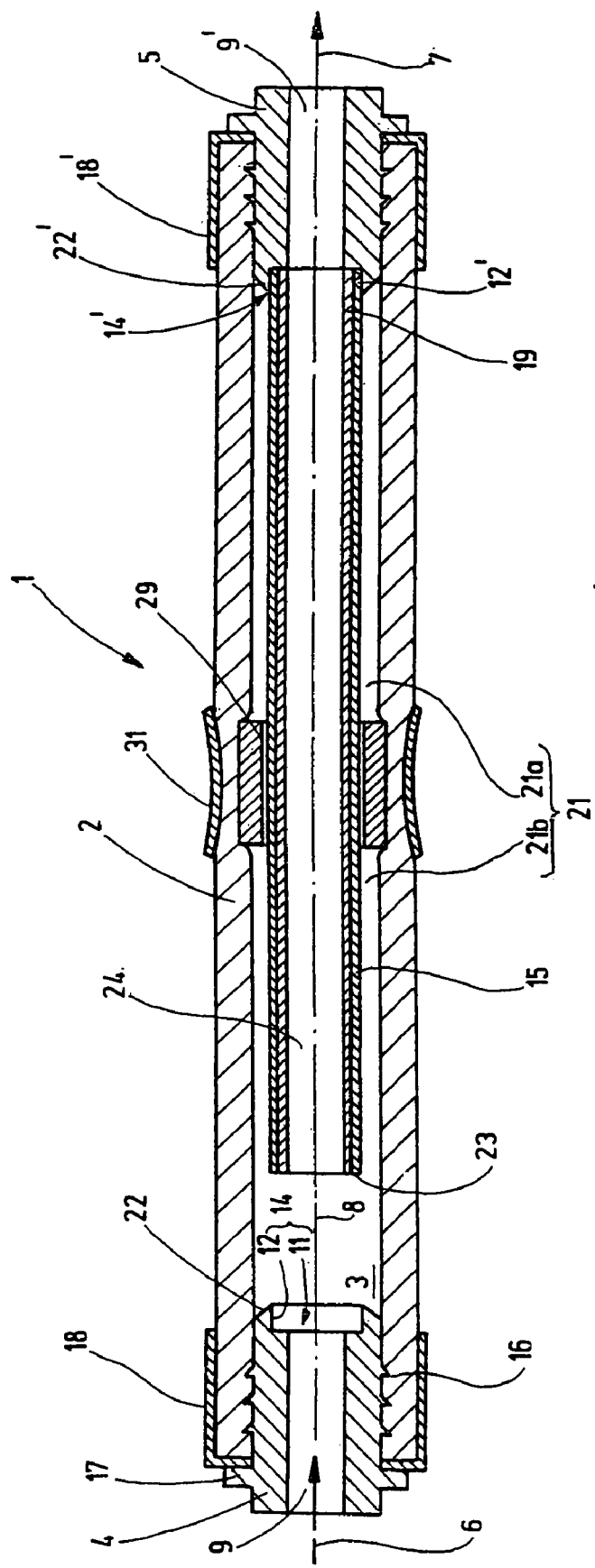
FIG. 4 is a simplified view, in longitudinal direction, of another modified form of embodiment of said damping device.

FIG. 1 shows a damping device 1 which is used for installation in a hydraulic system. In practical applications, such a damping device 1 is also referred to as a tuner or a resonator. Damping device 1, for example, is used in a hydraulic system for pulsation and sound damping and is arranged, for example, between a hydraulic pump and a hydraulic load, for example, a hydraulic power-assisted steering system.

Damping device 1 comprises a damper housing 2 which, for example, is created by a section of an expansion hose. This expansion hose may be a fabric-reinforced rubber hose or the like. This hose has a given elasticity in radial direction and/or in axial direction. Damper housing 2 encloses an approximately cylindrical internal space 3 which is closed on both ends by connecting pieces 4, 5. Both connecting pieces 4, 5 have respectively the same configuration. Connecting piece 4 forms the input connection while connecting piece 5 forms the output connection. To this end, arrows 6, 7 symbolize the direction of flow in which the medium flows through damping device 1. Connecting piece 4 will be described hereinafter. The details of connecting piece 5 have the same reference numbers (with an apostrophe, to be able to make a distinction), whereby the same applies to the description.

Connecting piece 4 has a through bore 9 extending in a direction that is coaxial with respect to a longitudinal central axis 8 of damper housing 2, whereby said bore 9 forms the input or output (through bore 9') of damping device 1. Connecting piece 4 comprises means for connecting a hydraulic line which are not illustrated in detail. These means may be internal or external threads or other connecting means. At the end of connecting piece 4 located in internal space 3 through bore 9 widens in a step 11 to a larger diameter which is determined by a wall 12 arranged in a cylindrical and coaxial manner relative to longitudinal central axis 8. Step 11 and wall 12 form a seat 14 for damper pipe 15.

The cylindrical external side of connecting piece 4 has one or more annular or thread-like helically arranged ribs 16, whereby said ribs have a triangular cross-section. These ribs are used for fixing connecting piece 4 in place on the internal wall of damper housing 2. In addition, connecting piece 4 has an annular flange 17 extending in radial direction, said flange forming an end stop when connecting piece 4 is inserted into the open end of damper housing 2. Between flange 17 and the face end of damper housing 2, there is a covering cap 18 which has a socket-shaped section that extends over the outside of the damper housing to approximately cover the end of connecting piece 4. Cover plate 18 may be pressed together with damper housing 2 in order to ensure that connecting piece 4 is firmly seated.

Damper pipe 15 is held on one end 19 at seat 14' of the output-side connecting piece 5. To do so, end 19 is seated in the pressed seat in the internal space enclosed by wall 12'. Consequently, damper pipe 15 extends in a self-supporting manner into internal space 3, whereby said pipe and the internal wall of damper housing 2 define an annular damper space 21. This space does not contain any components or elements and hence is empty. On its face, said space is closed by a conical annular surface 22' of connecting piece 5, for example. The pitch of this annular surface 22' relative to longitudinal central axis 8 is preferably 45 degrees. Therefore, this surface acts as an insertion guide when connecting piece 5 is inserted into the hose which forms damper housing 3.

The length of damper pipe 15 preferably has dimensions which are such that the free open end of said pipe is at a distance from connecting piece 4, which said distance is at most slightly greater than the internal diameter of damper housing 2. Its passage channel 24 has the same diameter as that of through bore 9, 9'. The facing end of damper pipe 15 is configured as a flat annular surface 25.

Damper pipe 15, for example, is designed as shown by FIG. 2. Said damper pipe has a closed wall which is formed by a plastic element 26. This element consists of PTFE, for example, or of another plastic material which exhibits sufficient thermal stability and is resistant to the medium flowing through damping device 1. Plastic element 26 is stiffened in radial direction by means of a support structure 27. This support structure is formed, for example, by a helically wound metal wire or ribbon 28. This ribbon may be wound also in such a manner that the individual wraps continuously abut against each other. As is shown by FIG. 2, plastic element 26 is applied to the outside of said support structure 27. For example, it may also be configured as a shrunk-on hose or an otherwise applied plastic coating. Due to this support structure, damper pipe 15 is rigid toward the inside, whereas the damper housing is slightly resilient toward the outside.

As an alternative, support structure 27 may be at least partially embedded in plastic element 26, as shown by FIG. 3. In this case, individual wraps of the metal ribbon include gaps which are filled by the plastic material of plastic element 26. In both cases, damper pipe 15 is impervious to media along its entire length and is reinforced by support structure 27 along its entire length. Considering its strength properties, said damper pipe is homogeneous. Support structure 27 is provided solely for the purpose of reinforcement. This structure protects the applied plastic pipe against collapse or compression, even in the event of pressure shocks.

The above-described damper device 1 works as follows:

During operation, medium flows through damper housing 2 in such a manner that open end 23 of damper pipe 15 opposes the arriving flow. If pressure waves enter internal space 3, these waves enter—as one pressure wave—predominantly damper space 21 and are reflected there by annular surface 22' in order to move back. In doing so, these waves are damped and, in addition, can interfere with newly entering pressure waves. Considering the transmission of pressure, damper pipe 15 is hard, i.e., pressure waves moving along damper space 21 are transmitted only minimally, or not at all, to the medium flowing through passage channel 24. The result is an extremely effective pulsation damper which eliminates, or significantly damps, in particular, low-frequency pulsations and pressure peaks.

FIG. 4 shows a modified form of embodiment of damping device 1. It largely corresponds to damping device 1 of FIG. 1. Therefore, using as basis the same reference numbers, reference is made to the description of the form of embodiment of FIG. 1. Damping device 1 of FIG. 4 differs from the latter in that it comprises a damper element in damper space 21. Said element may be configured, for example, as a throttle sleeve 29 which is provided at a selected location in damper space 21. In doing so, said sleeve encloses damper pipe 15 in a concentric manner. With said sleeve, said damper pipe closes an annular gap having a radial thickness of one tenth of a millimeter, for example. Thus, said throttle sleeve divides damper space 21 into two partial damper spaces 21a, 21b, which are acoustically coupled with each other by the annular gap defined with damper pipe 15. Such a throttle sleeve 29 may be used for intensifying the damping effect, for equalizing damper device 1 and for adjusting a desired damper band width. In addition, throttle sleeve 29 also creates a certain supporting effect for damper pipe 15.

Throttle sleeve 25 is protected against axial shifting in damper housing 2, for example, by a throttle fixation sleeve 31, which is placed on the outside of the hose. Throttle fixation sleeve 31 may be configured, for example, as a closed ring which encloses the throttle housing on the outside at the site where throttle sleeve 29 is located. Throttle fixation sleeve 31 is compressed in radial direction in order to immovably fix throttle sleeve 29 in position.

For installation in fluid systems, in particular hydraulic systems, a damping device is provided which comprises an expansion hose 2 containing on the inside a mostly rigid damper pipe 15 oriented counter to the direction of flow. Damper pipe 15 comprises a completely closed pipe wall which successfully enables a good damping effect. Preferably, damper pipe 15 is distinctly less flexible in radial direction than the external expansion pipe. This substantially enhances the damping effect.

What is claimed is:

1. A damping device for a fluid system, comprising:
   a damper housing which encloses an internal space and has an input connection, as well as an opposing output connection, and
   a damper pipe which has a closed wall and, starting from the output connection, extends into said internal space, wherein the damper pipe contains a support structure.

2. The damping device in accordance with claim 1, wherein the damper housing is configured as a tubular body.

3. The damping device in accordance with claim 1, wherein the damper housing is a cylindrical pipe.

4. The damping device in accordance with claim 1, wherein the damper housing is made of an elastic material.

5. The damping device in accordance with claim 1, wherein the damper housing is configured as an expansion hose.

6. The damping device in accordance with claim 2, wherein the input and output connections include connecting pieces which are inserted in the tubular body.

7. The damping device in accordance with claim 6, wherein the connecting pieces are configured respectively in the same manner.

8. The damping device in accordance with claim 1, wherein the length of the internal space of the damper housing is greater than ten times the internal diameter of the damper housing.

9. The damping device in accordance with claim 1, wherein the damper pipe is arranged in the internal space in a concentric manner with respect to the damper housing.

10. The damping device in accordance with claim 6, wherein the damper pipe is held by the connecting piece to which the output connection is fixed.

11. The damping device in accordance with claim 1, wherein the damper pipe extends into the internal space in a self-supporting manner so that, between the damper housing and the damper pipe, a free annular space is formed.

12. The damping device in accordance with claim 11, wherein the damper pipe has a free open end which is located opposite the input connection.

13. The damping device in accordance with claim 12, wherein the distance of the free end from the input connection is in a range having as its lower limit the internal diameter of the damper housing and as its upper limit twice the internal diameter of the damper housing.

14. The damping device in accordance with claim 1, wherein the damper pipe is configured in a flexible manner.

15. The damping device in accordance with claim 1, wherein the damper pipe is a plastic pipe.

16. The damping device in accordance with claim 1, wherein the support structure is embedded in the damper pipe.

17. The damping device in accordance with claim 1, wherein the support structure is a helically wound spiral.

18. The damping device in accordance with claim 1, wherein the support structure is a ribbon spiral.

19. The damping device in accordance with claim 1, wherein the damper pipe exhibits a radial elasticity which is lower than the radial elasticity of the damper housing.

* * * * *